United States Patent
Liu et al.

(10) Patent No.: US 12,018,162 B2
(45) Date of Patent: Jun. 25, 2024

(54) ACRYLIC POLYMERS FOR INKJET INK APPLICATIONS

(71) Applicant: Cabot Corporation, Boston, MA (US)

(72) Inventors: Tianqi Liu, Boxborough, MA (US); Jinqi Xu, Westford, MA (US)

(73) Assignee: Cabot Corporation, Boston, MA (US)

( * ) Notice: Subject to any disclaimer, the term of this patent is extended or adjusted under 35 U.S.C. 154(b) by 586 days.

(21) Appl. No.: 17/287,289

(22) PCT Filed: Oct. 23, 2019

(86) PCT No.: PCT/US2019/057597
§ 371 (c)(1),
(2) Date: Apr. 21, 2021

(87) PCT Pub. No.: WO2020/086678
PCT Pub. Date: Apr. 30, 2020

(65) Prior Publication Data
US 2021/0395548 A1     Dec. 23, 2021

Related U.S. Application Data

(60) Provisional application No. 62/750,498, filed on Oct. 25, 2018.

(51) Int. Cl.
   C09D 11/322 (2014.01)
   C09D 11/107 (2014.01)
   C09D 11/324 (2014.01)
   C09D 11/38 (2014.01)

(52) U.S. Cl.
   CPC .......... *C09D 11/322* (2013.01); *C09D 11/107* (2013.01); *C09D 11/324* (2013.01); *C09D 11/38* (2013.01)

(58) Field of Classification Search
   CPC ... C09D 11/322; C09D 11/107; C09D 11/324; C09D 11/38
   See application file for complete search history.

(56) References Cited

U.S. PATENT DOCUMENTS

| | | |
|---|---|---|
| 5,830,927 A | 11/1998 | Vanderhoff et al. |
| 6,039,793 A | 3/2000 | Gundlach et al. |
| 6,156,111 A * | 12/2000 | Schwarz ............. C09D 11/38 106/31.75 |
| 8,029,609 B2 | 10/2011 | Masada et al. |
| 8,038,782 B2 | 10/2011 | Tateishi et al. |
| 8,114,923 B2 | 2/2012 | Sarkisian et al. |
| 8,858,695 B2 | 10/2014 | Gu et al. |
| 9,371,461 B2 | 6/2016 | Saito et al. |
| 9,731,533 B2 | 8/2017 | Jarvis et al. |
| 10,253,200 B2 | 4/2019 | Kakikawa et al. |
| 2003/0199610 A1 | 10/2003 | Podhajny |
| 2007/0100024 A1 | 5/2007 | Feng et al. |
| 2008/0206465 A1 | 8/2008 | Han-Adebekun et al. |
| 2010/0121023 A1 | 5/2010 | Fukui et al. |
| 2013/0070031 A1 | 3/2013 | Nelson et al. |
| 2013/0278689 A1 | 10/2013 | Sowinski et al. |
| 2013/0300804 A1 | 11/2013 | Okamura et al. |
| 2014/0055520 A1 | 2/2014 | Inumaru et al. |
| 2016/0102218 A1 | 4/2016 | Liu et al. |
| 2017/0137650 A1 | 5/2017 | Liu et al. |
| 2018/0334582 A1 | 11/2018 | Liu et al. |

FOREIGN PATENT DOCUMENTS

| | | |
|---|---|---|
| CN | 101351509 A | 1/2009 |
| CN | 104046131 A | 9/2014 |
| EP | 0672733 A1 | 9/1995 |
| EP | 2662421 A1 | 11/2013 |
| EP | 2662423 A1 | 11/2013 |
| JP | 2007145887 A | 6/2007 |
| WO | WO 2017/112586 * | 6/2017 |
| WO | WO 2018/213020 A1 | 11/2018 |

OTHER PUBLICATIONS

The International Search Report and The Written Opinion of International Application No. PCT/US2018/031029, mailed Jul. 26, 2018.
The International Search Report and the Written Opinion of the International Searching Authority, or the Declaration of International Application No. PCT/US2019/057597, mailed Feb. 17, 2020.

* cited by examiner

*Primary Examiner* — Patrick D Niland

(57) ABSTRACT

Disclosed herein are inkjet ink compositions comprising: at least one pigment having attached at least one organic group having a calcium index value greater than a calcium index value of 1,2,3-benzene tricarboxylic acid; at least one acrylic polymer having an acid number of at least 150 KOH/g and a weight average molecular weight ranging from 1,000 to 15,000, wherein the at least one acrylic polymer is at least partially neutralized with a base having the following structure: wherein: A is a $C_2$-$C_{12}$ alkyl, $R^1$ is selected from H, $C_1$-$C_{12}$ alkyl, an amine having the formula —$NR^3R^4$, and a guanidine residue having the formula —$N(R^5)$—C($=$NH)—$N(R^6)(R^7)$, wherein $R_3$ to $R^7$ are independently selected from H and $C_1$-$C_{12}$ alkyl, and $R^2$ is selected from H, $C_1$-$C_{12}$ alkyl, and an acid group. The inkjet ink composition further comprises an aqueous liquid medium.

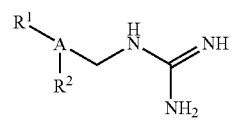

28 Claims, No Drawings

ACRYLIC POLYMERS FOR INKJET INK APPLICATIONS

FIELD OF THE INVENTION

Disclosed herein are inkjet ink compositions comprising at least one pigment and at least one acrylic polymer.

BACKGROUND

There is a need for pigment-based inkjet ink compositions having suitable optical density, e.g., when deposited on plain paper.

SUMMARY

Disclosed herein are inkjet ink compositions comprising:
at least one pigment having attached at least one organic group having a calcium index value greater than a calcium index value of 1,2,3-benzene tricarboxylic acid;
at least one acrylic polymer having an acid number of at least 150 mg KOH/g and a weight average molecular weight ranging from 1,000 to 15,000, wherein the at least one acrylic polymer is at least partially neutralized with a base having the following structure:

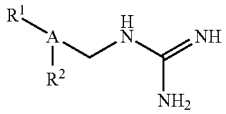

wherein:
A is a $C_2$-$C_{12}$ alkyl,
$R^1$ is selected from H, $C_1$-$C_{12}$ alkyl, an amine having the formula —$NR^3R^4$, and a guanidine residue having the formula —$N(R^5)$—$C(=NH)$—$N(R^6)(R^7)$, wherein $R_3$ to $R^7$ are independently selected from H and $C_1$-$C_{12}$ alkyl, and
$R^2$ is selected from H, $C_1$-$C_{12}$ alkyl, and an acid group; and an aqueous liquid medium.

DETAILED DESCRIPTION

For aqueous inkjet printing on plain papers, it is common to see pigment particles penetrating the paper fiber network because of the hydrophilic nature and high porosity of the substrates. This penetration can result in low optical density (OD) on the top surface of the paper and/or high see-through on the back side. For inkjet applications, some grades of plain papers are treated with free soluble di/trivalent ions, e.g., calcium and/or magnesium. The di/trivalent metal ions coagulate with the pigments to form larger aggregates. As a result, pigment penetration into the fiber is reduced and higher pigment concentration remains on the top surface. However, this paper treatment can add cost to the paper manufacturers, printing facilities, and eventually the consumers.

Another desirable attribute for aqueous inkjet printing is quick drying of the ink droplets on the paper to avoid smear and image transfer. However, ink formulation approaches to enable faster drying (e.g., enabling the inkjet liquid to penetrate faster into the paper fiber network) may result in low optical density due to the insufficient amount of time for pigments to interact with paper fiber or calcium carbonate.

It was discovered that certain polymer and pigment combinations can enhance at least optical density by inkjet printing on plain paper. Accordingly, one embodiment provides an inkjet ink composition comprising:
at least one pigment having attached at least one organic group having a calcium index value greater than a calcium index value of 1,2,3-benzene tricarboxylic acid;
at least one acrylic polymer having an acid number of at least 150 mg KOH/g and a weight average molecular weight ranging from 1,000 to 15,000; and
an aqueous liquid medium.

In plain paper manufacturing, starch is added to the base sheet as a glue to bind inorganic particles together and impart stiffness of the sheets for runnability in printing presses. Starch is sensitive to water and can swell dramatically upon contact with water. Without wishing to be bound by any theory, certain polymers in aqueous ink compositions may facilitate the process of starch wetting and swelling to afford improved OD performance. The swelled starch can lower the porosity of the plain paper and therefore hinder the penetration of pigment particles into the paper fiber network.

Without wishing to be bound by any theory, polymers having a low molecular weight and high acid number (contributing to hydrophilicity) are relatively mobile and can facilitate wetting and swelling of the starch in/on the plain paper surface. The resulting reduction in paper porosity may enable more efficient capture of the pigment particles by the paper fiber matrix, e.g., for plain paper, or di/trivalent metal ions present in a treated paper. This can allow more pigment particles to remain on the top surface of the paper and maximize pigment use in contributing to optical density performance.

In one embodiment, the at least one polymer is an acrylic polymer. In one embodiment, the acrylic polymer comprises at least one acrylic monomer. In one embodiment, the at least one acrylic monomer comprises an ethylenically unsaturated carboxylic acid and salts thereof.

In one embodiment, the at least one acrylic monomer is characterized by its acid number (AN). The acid number of the at least one acrylic polymer can be calculated from the following equation:

AN=(no. mol of COOH-containing monomer×56.1 mgKOH×1000)/(the total mass (g) of monomers In one embodiment, the COOH-containing monomer can comprise the acrylic monomer and optionally other monomers containing COOH. In another embodiment, the COOH-containing monomer is the acrylic monomer. In one embodiment, the acrylic polymer has an acid number of at least 150 mg KOH/g (acrylic polymer). In another embodiment, the acid number is at least 160 mg KOH/g acrylic polymer, e.g., at least 175, or at least 200 mg KOH/g acrylic polymer. In another embodiment, the acid number ranges from 150 to 400, e.g., from 160 to 400, from 175 to 400, from 200 to 400, from 150 to 300, from 160 to 300, from 175 to 300, from 200 to 300, from 150 to 250, from 160 to 250, from 175 to 250, or from 200 to 250 mg KOH/g acrylic polymer.

In one embodiment, the at least one acrylic polymer has a weight average molecular weight ranging from 1,000 to 15,000, e.g., from 1,000 to 14,000, from 1,000 to 13,000, from 1,000 to 10,000, from 3,000 to 15,000, from 3,000 to 14,000, from 3,000 to 13,000, or from 3,000 to 10,000.

Aqueous inkjet inks typically contain organic solvents, e.g., humectants and/or penetrants. Humectants can help achieve a desired viscosity of the inkjet ink composition and/or can maintain a suitable moisture level in printhead nozzle orifices. Penetrants are surface active and can be used to control jetting behavior, droplet spreading, and/or droplet penetration on printing substrates. An ink composition comprising both dispersed pigments and polymers typically show stability in water and solvent/water mixtures when water is present in an amount of at least 50% by weight. There are situations, however, when water can evaporate resulting in a composition having a water concentration less than 50 wt %, e.g., when print nozzles are at rest between jetting sequences or are uncapped during storage. Such an environment can render the pigment particles less stable. Moreover, the presence of acrylic polymers can increase the viscosity of the inks, which can lead to problems with jetting.

Incorporating organic counterions to the system by neutralizing acrylic polymers with certain organic bases (e.g., tetraethylammonium hydroxide) increases the compatibility and/or stability of the pigment and/or polymer in the situation where an ink composition has less than 50 wt % water. Such compatibility/stability is improved compared to compositions where polymers are neutralized with inorganic bases such as sodium hydroxide. However, this improved compatibility and/or stability may lead to a decrease in optical density (O.D.) when the ink is deposited on a substrate (e.g., paper). High O.D. typically requires faster coagulation or flocculation of the pigment particles, and this ability is reduced when stability/compatibility improves. Thus, for such compositions there is a trade-off between pigment/polymer compatibility/stability and O.D. performance.

It has been discovered that the tradeoff between compatibility/stability and O.D. performance can be managed by neutralization of the polymer with certain bases that incorporate a guanidine structure. Such bases can achieve improved compatibility and/or stability when compared to inorganic bases, and without significantly reducing O.D. when compared to other organic bases.

Accordingly, another embodiment provides an inkjet ink composition comprising:
  at least one pigment having attached at least one organic group having a calcium index value greater than a calcium index value of 1,2,3-benzene tricarboxylic acid;
  at least one acrylic polymer having an acid number of at least 150 mg KOH/g and a weight average molecular weight ranging from 1,000 to 15,000, wherein the at least one acrylic polymer is at least partially neutralized with a base having the following structure:

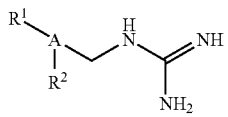

wherein:
  A is a $C_2$-$C_{12}$ alkyl,
  $R^1$ is selected from H, $C_1$-$C_{12}$ alkyl, an amine having the formula —$NR^3R^4$, and a guanidine residue having the formula —$N(R^5)$—$C(=NH)$—$N(R^6)(R^7)$, wherein $R_3$ to $R^7$ are independently selected from H and $C_1$-$C_{12}$ alkyl, and
  $R^2$ is selected from H, $C_1$-$C_{12}$ alkyl, and an acid group; and
  an aqueous liquid medium.

In one embodiment, the at least one acrylic polymer is at least partially neutralized with the base, e.g., the at least one acrylic polymer is at least 40% neutralized, at least 50% neutralized, at least 60% neutralized, at least 70% neutralized, at least 80% neutralized, at least 90% neutralized, at least 95% neutralized, at least 99% neutralized, or wholly neutralized (100% neutralized) with the base. A desired amount neutralization can be calculated from the acid number of the at least one polymer. In one embodiment, the pH of the composition (after neutralization) can range from 6-10, e.g., from 6-9, from 6 to 8.5, from 7-10, from 7-9, or from 7-8.5.

In one embodiment, the at least one acrylic polymer is at least partially neutralized with a base, resulting in the base acting as a counterion (cation) having a net charge of +1. This net charge can be achieved by the choice of the $R^1$ and $R^2$ groups and/or the protonation of the nitrogen groups on the guanidine residue of the base. In one embodiment, neutralization with the base can be achieved by a combination of the at least one polymer with the base in neutral form, causing proton transfer from the polymer to the base and yielding the base as a counterion (cation) having a net charge of +1.

In another embodiment, the at least one acrylic polymer is at least partially neutralized with a base by a combination of the at least one polymer with the base in cationic form (e.g., a salt). In one embodiment, this combination causes ion exchange between the at least one polymer, and its protons and/or counterions, with the cationic base (the base has net charge of +1) and its respective counterions. For example, the polymer can have sodium counterions that can be ion-exchanged with the cationic base, resulting in the at least one polymer having the cationic base as a counterion, in which the base has a net charge of +1 (e.g., an arginine cation).

In one embodiment, A is a $C_2$-$C_6$ alkyl, such as ethyl. In one embodiment, $R^1$ and $R^2$ can be bonded to the same or different carbon atoms of A. In one embodiment, $R^1$ and $R^2$ are bonded to the same carbon atom of A.

In one embodiment, $R^1$ is an amine having the formula —$NR^3R^4$ wherein $R^3$ and $R^4$ are independently selected from H and $C_1$-$C_{12}$ alkyl, e.g., from H and $C_1$-$C_6$ alkyl (e.g., methyl or ethyl). In one embodiment, at least one of $R^3$ and $R^4$ are H. In another embodiment, both $R^3$ and $R^4$ are H.

In one embodiment, $R^1$ is a guanidine residue having the formula —$N(R^5)$—$C(=NH)$—$N(R^6)(R^7)$ wherein $R^5$ to $R^7$ are independently selected from H and $C_1$-$C_{12}$ alkyl, e.g., from H and $C_1$-$C_6$ alkyl (e.g., methyl or ethyl).

In one embodiment, $R^2$ is selected from H, $C_1$-$C_{12}$ alkyl (e.g., $C_1$-$C_6$ alkyl, such as methyl or ethyl), and an acid group. In one embodiment, $R^2$ is selected from an acid group. The acid group can be selected from carboxylic acid, sulfonic acid, and phosphonic acid. In one embodiment, $R^2$ is an acid group selected from carboxylic acid.

In one embodiment, A is a $C_2$-$C_6$ alkyl, $R^1$ is an amine having the formula —$NR^3R^4$, and $R^2$ is an acid group. In one embodiment, $R^3$ and $R^4$ are H, and $R^2$ is a carboxylic acid. In one embodiment, the at least one polymer is at least partially neutralized with arginine.

In one embodiment, A is a $C_2$-$C_6$ alkyl, $R^1$ is an amine having the formula —$N(R^5)$—$C(=NH)$—$N(R^6)(R^7)$, and $R^2$ is an acid group. In one embodiment, $R^5$ to $R^7$ are H, and $R^2$ is a carboxylic acid.

In one embodiment, the at least one acrylic polymer comprises at least one acrylic monomer in an amount of at least 20 mol %, e.g., an amount of at least 25 mol %. The at least one acrylic polymer can be a copolymer. In another embodiment, the at least one acrylic polymer comprises at least one acrylic monomer in an amount ranging from 20 mol % to 75 mol %, e.g., from 25 mol % to 75 mol %, from 20 mol % to 70 mol %, from 25 mol % to 70 mol %, from 20 mol % to 65 mol %, or from 25 mol % to 65 mol %.

In one embodiment, the at least one acrylic monomer is selected from acrylic acid, methacrylic acid, crotonic acid, ethacrylic acid, propylacrylic acid, isopropylacrylic acid, itaconic acid, and fumaric acid, and salts thereof. In one embodiment, the at least one acrylic monomer is selected from acrylic acid, methacrylic acid, and salts thereof.

In one embodiment, the at least one acrylic polymer is a copolymer, e.g., a random copolymer. In addition to the at least one acrylic monomer, the at least one acrylic polymer can further comprise at least one second monomer that is copolymerizable with the at least one acrylic monomer. In one embodiment, the at least one second monomer is selected from: esters, aminoesters and amides of acrylic acid, methacrylic acid, crotonic acid, ethacrylic acid, propylacrylic acid, isopropylacrylic acid, itaconic acid, fumaric acid, and maleic acid; addition reaction products between oil and fatty acids and (meth)acrylic ester monomers having an oxirane structure; addition reaction products between oxirane compounds containing an alkyl group having 3 or more carbon atoms and (meth)acrylic acid; styrenes; acrylonitriles; acetates; and allyl alcohols.

Exemplary second monomers include (meth)acrylic esters, such as methyl acrylate, ethyl acrylate, isopropyl acrylate, n-propyl acrylate, n-butyl acrylate, t-butyl actylate, 2-ethylhexyl acrylate, n-octyl acrylate, lauryl acrylate, benzyl acrylate, methyl methacrylate, ethyl methacrylate, isopropyl methacrylate, n-propyl methacrylate, n-butyl methacrylate, isobutyl methacrylate, t-butyl methacrylate, 2-ethylhexyl methacrylate, n-octyl methacrylate, lauryl methacrylate, stearyl methacrylate, tridecyl methacrylate, and benzyl methacrylate; addition reaction products between oil and fatty acids and (meth)acrylic ester monomers having an oxirane structure, such as an addition reaction product between stearic acid and glycidyl methacrylate; addition reaction products between oxirane compounds containing an alkyl group having 3 or more carbon atoms and (meth)acrylic acid; styrenes, such as styrene, α-methylstyrene, o-methylstyrene, m-methylstyrene, p-methylstyrene, and p-tert-butylstyrene; itaconic esters, such as benzyl itaconate; maleic esters, such as dimethyl maleate; fumaric esters, such as dimethyl fumarate; and acrylonitrile, methacrylonitrile, vinyl acetate, isobornyl acrylate, isobornyl methacrylate, aminoethyl acrylate, aminopropyl acrylate, methylaminoethyl acrylate, methylaminopropyl acrylate, ethylaminoethyl acrylate, ethylaminopropyl acrylate, aminoethylamide of acrylic acid, aminopropylamide of acrylic acid, methylaminoethylamide of acrylic acid, methylaminopropylamide of acrylic acid, ethylaminoethylamide of acrylic acid, ethylaminopropylamide of acrylic acid, methacrylic acid amide, aminoethyl methacrylate, aminopropyl methacrylate, methylaminoethyl methacrylate, methylaminopropyl methacrylate, ethylaminoethyl methacrylate, ethylaminopropyl methacrylate, aminoethylamide of methacrylic acid, aminopropylamide of methacrylic acid, methylaminoethylamide of methacrylic acid, methylaminopropylamide of methacrylic acid, ethylaminoethylamide of methacrylic acid, ethylaminopropylamide of methacrylic acid, hydroxymethyl acrylate, 2-hydroxyethyl acrylate, 2-hydroxypropyl acrylate, hydroxymethyl methacrylate, 2-hydroxyethyl methacrylate, 2-hydroxypropyl methacrylate, N-methylolacrylamide, and allyl alcohol.

In one embodiment, the at least one second monomer is selected from styrenes, such as styrene, α-methylstyrene, o-methylstyrene, m-methylstyrene, p-methylstyrene, and p-tert-butylstyrene. In one embodiment, the at least one second monomer is styrene.

In one embodiment, the at least one acrylic polymer that is at least partially neutralized with the base is self-dispersible or soluble in an aqueous liquid medium, e.g., does not need additional surfactants or dispersants to disperse or dissolve in the aqueous liquid medium.

In one embodiment, the at least one acrylic polymer is present in an amount ranging from 0.5 wt % to 5 wt % relative to the total weight of the composition, e.g., an amount ranging from 0.5 wt % to 4 wt %, from 0.5 wt % to 3 wt %, from 1 wt % to 5 wt %, from 1 wt % to 4 wt %, or from 1 wt % to 3 wt %.

In one embodiment, the polymer/pigment ratio is 0.05 to 2, e.g., from 0.05 to 1, from 0.05 to 0.5, from 0.05 to 0.3, from 0.1 to 2, from 0.1 to 1, from 0.1 to 0.5, from 0.1 to 0.3, from 0.15 to 2, from 0.15 to 1, from 0.15 to 0.5, or from 0.15 to 0.3.

In one embodiment, the pigment is a self-dispersed pigment, e.g., the pigment is self-dispersible. In one embodiment, the self-dispersed pigment is a modified pigment having at least one attached organic group. In one embodiment, an "attached" organic group can be distinguished from an adsorbed group in that a soxhlet extraction for several hours (e.g., at least 4, 6, 8, 12, or 24 hours) will not remove the attached group from the pigment. In another embodiment, the organic group is attached to the pigment if the organic group cannot be removed after repeated washing (e.g., 2, 3, 4, 5, or more washings) with a solvent or solvent mixture that can dissolve the starting organic treating material but cannot disperse the treated pigment. In yet another embodiment, "attached" refers to a bond such as a covalent bond, e.g., a pigment bonded or covalently bonded to the organic group.

In one embodiment, the composition comprises at least one pigment having attached at least one organic group capable of binding calcium, i.e., having a calcium index value greater than a calcium index value of 1,2,3-benzene tricarboxylic acid. In one embodiment, calcium binding capability can be quantified via calcium index values, as described in U.S. Pat. No. 8,858,695, the disclosure of which is incorporated herein by reference. "Calcium index value" refers to a measure of the ability of an organic group to coordinate or bind calcium ions in solution. The higher the calcium index value, the more strongly or effectively the group can coordinate calcium ions. Calcium index values can also be used to indicate binding capability of other divalent metal ions, e.g., magnesium.

Calcium index values can be determined by any method known in the art. For example, the calcium index value may be measured with a method in which the amount of calcium coordinated by a compound in a standard solution containing soluble calcium ions and a color indicator is measured using UV-Vis spectroscopy. Alternatively, for compounds having a strong color, the calcium index value may be measured using an NMR method.

In one embodiment, "calcium index value," is determined according to the methods described in U.S. Pat. No. 8,858,695, e.g., Method A or Method B at col. 29, line 45 to col. 31, line 37, the disclosure of which is incorporated herein by reference. For either method used, a compound was chosen that corresponds to a desired organic group to be tested. In the test compound, the at least one organic group can be bonded to any residue so long as the atoms responsible for binding calcium ions are separated from the residue by at least two bonds. The residue can comprise or consist of hydrogen, a $C_1$-$C_{10}$ alkyl (substituted or unsubstituted), or $C_4$-$C_{18}$ aryl (substituted or unsubstituted), e.g., the compound to be tested can comprise the organic group bonded to hydrogen, a $C_1$-$C_{10}$ alkyl (substituted or unsubstituted), or $C_4$-$C_{18}$ aryl (substituted or unsubstituted). For example, for a 3,4,5-tricarboxyphenyl functional group and salts thereof, 1,2,3-benzene tricarboxylic acid can be chosen. In this example, the residue is hydrogen and the oxygen atoms of the carboxylic acids are at least two bonds away from the hydrogen residue.

In one embodiment, reference to the calcium index value means that the value is greater than or equal to that of a reference material. In one embodiment, the reference is 1,2,3-benzene tricarboxylic acid. Thus, the at least one organic group, has a calcium index value that is greater than the calcium index value of 1,2,3-benzene tricarboxylic acid. In another embodiment, the reference is 1,2,3-benzene tricarboxylic acid. In one embodiment, the calcium index value is greater than or equal to 2.8, greater than or equal to 3.0, or greater than or equal to 3.2, as determined using UV-Vis spectroscopy (or method A), as described in more detail below.

Method A. For this method, a series of solutions were prepared at pH 9 that contained 0.087 mM Congo Red indicator, 5 mM cesium chloride, 1 wt % MW350 polyethylene glycol methyl ether, and calcium chloride in concentrations ranging from 0 to 7 mM (0.2, 0.5, 1, 2, 3, 4, 4.5, 5, 6, and 7 mM). The UV-Vis spectra of these solutions were recorded within 1 hour of their preparation using a UV-2501PC. These spectra were used to create a calibration curve relating the absorbance at 520 nm to the calcium concentration.

Test solutions were then prepared at pH 9 that contained 0.087 mM Congo Red indicator, 1 wt % MW350 polyethylene glycol methyl ether, 5 mM calcium chloride, and the cesium salt of the compound of interest such that the ion concentration at pH 9 was 5 mM. The uncomplexed calcium concentration was determined by comparison with the calibration curve. The calcium index value was then calculated as $\log_{10}((0.005-\text{uncomplexed calcium})/((\text{uncomplexed calcium})^2))$. Measurements were made in duplicate and averaged.

Method B. For compounds that develop a high level of color and are therefore difficult to use in Method A, a second method was developed. For this method, an aqueous solution that was 0.01M in $^{43}CaCl_2$, 0.01M in NaCl, 10% $D_2O$ and at pH 8 or 9 was prepared from $^{43}CaCO_3$, $HCl/D_2O$, $NaOH/D_2O$, $D_2O$ and water. The pH was chosen to ionize the compound under investigation and to dissolve the compound. A portion of the solution weighing about 0.65 g was added to a 5 mm NMR tube and weighed to the nearest 0.001 g. The chemical shift of the unbound $^{43}Ca$ was measured using a Bruker Avance II spectrometer with a proton resonance frequency at 400.13 MHz. A 0.2-1.0M solution of the compound (ligand) under investigation was added in successive increments. After each addition, the $^{43}Ca$ chemical shift was measured, and $\delta$, the difference between the chemical shift of the sample and that of unbound calcium was calculated. The successive increments were planned such that the $L_o/Ca_o$ ratio was 0.25, 0.5, 1, 2, 3, 4, 6 and 8 where $L_o$ is the total concentration of complexed, protonated and free anions from the ligand and $Ca_o$ is the total concentration of calcium in all species present. The calcium index value (NMR) was calculated as $\log_{10}(X)$ where X was determined by fitting the parameters X and $\delta_m$ in the equation:

$$\delta = \frac{\delta_m}{2}\left\{[1 + (L_0/Ca_0) + (1 + H^+/K_a)/(XCa_0)] - \sqrt{[1 + (L_0/Ca_0) + (1 + H^+/K_a)/(XCa_0)]^2 - 4(L_0/Ca_0)}\right\}$$

so that the RMS difference between the data and the predicted chemical shifts from the equation are minimized where:
  $\delta$ is the difference in the $^{43}Ca$ chemical shift of the sample vs that of free aqueous $^{43}Ca^{2+}$;
  $\delta_m$ is the calculated difference in the $^{43}Ca$ chemical shift at infinite L/Ca vs that of free $^{43}Ca^{2+}$;
  $L_o$ is the total concentration of complexed, protonated and free anions from the ligand;
  $Ca_o$ is the total concentration of calcium in all species present;
  X is a fitting parameter; and
  $K_a$ is the proton dissociation constant for the ligand LH.

In one embodiment, the at least one organic group is selected from at least one phosphonic acid group (e.g., at least two phosphonic acid groups), partial esters thereof, and salts thereof, such as a geminal bisphosphonic acid group, partial esters thereof, and salts thereof. In one embodiment, the at least one organic group may comprise at least one geminal bisphosphonic acid group, partial esters thereof, and salts thereof, that is, the at least one organic group may comprise at least two phosphonic acid groups, partial esters thereof, and salts thereof that are directly bonded to the same carbon atom. Such a group may also be referred to as a 1,1-diphosphonic acid group, partial ester thereof, or salt thereof. Thus, for example, the at least one organic group may comprise a group having the formula $-CQ(PO_3H_2)_2$, partial esters thereof, and salts thereof. Q is bonded to the geminal position and may be H, R, OR, SR, or $NR_2$ wherein R, which can be the same or different, is H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. For example, Q may be H, R, OR, SR, or $NR_2$, wherein R, which can be the same or different, is H, a $C_1$-$C_6$ alkyl group, or an aryl group. In one embodiment, Q is H, OH, or $NH_2$. Furthermore, the at least one organic group may comprise a group having the formula $-(CH_2)_n-CQ(PO_3H_2)_2$, partial esters thereof, and salts thereof, wherein Q is as described above and n is 0 to 9, such as 1 to 9, 0 to 3, or 1 to 3. In one embodiment, n is either 0 or 1. Also, the at least one organic group may comprise a group having the formula $-Y-(CH_2)_n-CQ(PO_3H_2)_2$, partial esters thereof, and salts thereof, wherein Q and n are as described above and Y is an arylene, heteroarylene, alkylene, vinylidene, alkarylene, aralkylene, cyclic, or heterocyclic group. In one embodiment, Y is an arylene group, such as a phenylene, naphthalene, or biphenylene group, which may be further substituted with any group, such as one or more alkyl groups or aryl groups. When Y is an alkylene group, examples include, but are not limited to, substituted or unsubstituted alkylene groups, which may be branched or unbranched and can be substituted with one or more groups, such as aromatic groups. Examples include, but are not limited to, $C_1$-$C_{12}$ groups like methylene, ethylene, propylene, or butylene, groups.

Y may be further substituted with one or more groups selected from, but not limited to, R', OR', COR', COOR', OCOR', carboxylates, halogens, CN, NR'$_2$, SO$_3$H, sulfonates, sulfates, NR'(COR'), CONR'$_2$, imides, NO$_2$, phosphates, phosphonates, N=NR', SOR', NR'SO$_2$R', and SO$_2$NR$_2$', wherein R' which can be the same or different, is independently hydrogen, branched or unbranched C$_1$-C$_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

In one embodiment, the at least one organic group may comprise a group having the formula —Y-Sp-(CH$_2$)$_n$—CQ(PO$_3$H$_2$)$_2$, partial esters thereof, or salt thereof, wherein Y, Q, and n are as described above. Sp is a spacer group, which, as used herein, is a link between two groups. Sp can be a bond or a chemical group. Examples of chemical groups include, but are not limited to, —CO$_2$—, —O$_2$C—, —CO—, —OSO$_2$—, —SO$_3$—, —SO$_2$—, —SO$_2$C$_2$H$_4$O—, —SO$_2$C$_2$H$_4$S—, —SO$_2$C$_2$H$_4$NR"—, —O—, —S—, —NR"—, —NR"CO—, —CONR"—, —NR"CO$_2$—, —O$_2$CNR"—, —NR"CONR"—, —N(COR")CO—, —CON(COR")—, —NR"COCH(CH$_2$CO$_2$R')— and cyclic imides therefrom, —NR"COCH$_2$CH(CO$_2$R")— and cyclic imides therefrom, —CH(CH$_2$CO$_2$R")CONR"— and cyclic imides therefrom, —CH(CO$_2$R")CH$_2$CONR" and cyclic imides therefrom (including phthalimide and maleimides of these), sulfonamide groups (including —SO$_2$NR"— and —NR"SO$_2$— groups), arylene groups, alkylene groups and the like. R", which can be the same or different, represents hydrogen or an organic group such as a substituted or unsubstituted aryl or alkyl group. As shown by the structure above, a group comprising at least two phosphonic acid groups and salts thereof is bonded to Y through the spacer group Sp. In one embodiment, Sp is —CO$_2$—, —O$_2$C—, —O—, —NR"CO—, or —CONR"—, —SO$_2$NR"—, —SO$_2$CH$_2$CH$_2$NR"—, —SO$_2$CH$_2$CH$_2$O—, or —SO$_2$CH$_2$CH$_2$S—, wherein R" is H or a C$_1$-C$_6$ alkyl group.

In addition, the at least one organic group may comprise at least one group having the formula —CR=C(PO$_3$H$_2$)$_2$, partial esters thereof, and salts thereof. R can be H, a C$_1$-C$_{18}$ saturated or unsaturated, branched or unbranched alkyl group, a C$_1$-C$_{18}$ saturated or unsaturated, branched or unbranched acyl group, an aralkyl group, an alkaryl group, or an aryl group. In one embodiment, R is H, a C$_1$-C$_6$ alkyl group, or an aryl group.

In one embodiment, the at least one organic group may comprise more than two phosphonic acid groups, partial esters thereof, and salts thereof and may, for example comprise more than one type of group (such as two or more) in which each type of group comprises at least two phosphonic acid groups, partial esters thereof, and salts thereof. For example, the at least one organic group may comprise a group having the formula —Y—[CQ(PO$_3$H$_2$)$_2$]p, partial esters thereof, or salt thereof. Y and Q are as described above. In one embodiment, Y is an arylene, heteroarylene, alkylene, alkarylene, or aralkylene group. In this formula, p is 1 to 4, e.g., p is 2.

In one embodiment, the at least one organic group may comprise at least one vicinal bisphosphonic acid group, partial ester thereof, and salts thereof, meaning that these groups are adjacent to each other. Thus, the at least one organic group may comprise two phosphonic acid groups, partial esters thereof, and salts thereof bonded to adjacent or neighboring carbon atoms. Such groups are also sometimes referred to as 1,2-diphosphonic acid groups, partial esters thereof, and salts thereof. The group comprising the two phosphonic acid groups, partial esters thereof, and salts thereof may be an aromatic group or an alkyl group, and therefore the vicinal bisphosphonic acid group may be a vicinal alkyl or a vicinal aryl diphosphonic acid group, partial ester thereof, and salts thereof. For example, the at least one organic group may be a group having the formula —C$_6$H$_3$—(PO$_3$H$_2$)$_2$, partial esters thereof, and salts thereof, wherein the acid, ester, or salt groups are in positions ortho to each other.

In one embodiment, the at least one organic group comprises at least one phosphonic acid group or a salt thereof and at least one second ionic, ionizable, or basic group vicinal or geminal to the phosphonic acid group, and salts thereof.

In one embodiment, the at least one organic group is selected from —C(OH)(PO$_3$H$_2$)$_2$, —CH$_2$C(OH)(PO$_3$H$_2$)$_2$, —CH$_2$CH$_2$C(OH)(PO$_3$H$_2$)$_2$, —CH$_2$CH$_2$CH$_2$C(OH)(PO$_3$H$_2$)$_2$, —CH(PO$_3$H$_2$)$_2$, —CH$_2$CH(PO$_3$H$_2$)$_2$, partial esters thereof, and salts thereof.

The amount of attached organic groups can be varied, depending on the desired use of the modified carbon black and the type of attached group. For example, the total amount of organic group may be from about 0.01 to about 10.0 micromoles of groups/m$^2$ surface area of pigment, as measured by nitrogen adsorption (BET method), including from about 0.5 to about 5.0 micromoles/m$^2$, from about 1 to about 3 micromoles/m$^2$, or from about 2 to about 2.5 micromoles/m$^2$. Additional attached organic groups, which differ from those described for the various embodiments of the present invention, may also be present.

The unmodified pigment, prior to attachment, can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold as Regal®, Black Pearls®, Elftex®, Monarch®, Mogul®, and Vulcan® carbon blacks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls®800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). In one embodiment, the pigment is a cyan pigment, such as Pigment Blue 15, Pigment Blue 15:3, Pigment Blue 15:4, or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or black pigment, such as carbon black.

In one embodiment, the pigment can be present in an amount effective to provide the desired image quality (for example, optical density) without detrimentally affecting the performance of the inkjet ink. In one embodiment, the pigment is present in the inkjet ink composition in an amount ranging from 0.1% to 20%, e.g., from 1% to 20%, from 1% to 10%, or from 3% to 8%, based on the total weight of the inkjet ink composition.

Dispersions and Inkjet Ink Compositions

In one embodiment, the dispersion is an aqueous dispersion such as an inkjet ink composition, e.g., comprising an aqueous liquid medium, which can be water. In one embodiment, the dispersion or inkjet ink composition comprises at least 40% water, e.g., at least 45% water or at least 50% water.

In one embodiment, the dispersion or inkjet ink composition comprises at least one organic solvent present in an amount ranging from 1% to 50% relative to the total weight of the inkjet ink composition, or present in other amounts as disclosed herein. In one embodiment, the organic solvent is soluble or miscible in water. In another embodiment, the organic solvent is chemically stable to aqueous hydrolysis conditions (e.g., reaction with water under heat aging conditions, including, for example, the hydrolysis of esters and lactones). In one embodiment, the organic solvent has a dielectric constant below that of water, such as a dielectric constant ranging from about 10 to about 78 at 20° C. Examples of suitable organic solvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly (ethylene-co-propylene) glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and &-caprolactam); ureas or urea derivatives (such as di-(2-hydroxyethyl)-5,5,-dimethyl hydantoin (dantacol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, and dimethylsulfolane). The organic solvent can comprise mixtures of organic solvents.

The amount of the solvent can be varied depending on a variety of factors, including the properties of the solvent (solubility and/or dielectric constant), the type of colorant, and the desired performance of the resulting inkjet ink composition. The solvent may be used in amounts ranging from 1% to 40% by weight based on the total weight of the inkjet ink composition, including amounts ranging from 1% to 30%, or amounts ranging from 1% to 20%. In another embodiment, the amount of the solvent is greater than or equal to about 2% by weight based on the total weight of the aqueous dispersion or inkjet ink composition, including greater than or equal to about 5% and greater than or equal to about 10% by weight.

In one embodiment, an ink composition (e.g., an inkjet ink composition) comprises at least one surfactant, e.g., when the pigment is not self-dispersible. The at least one surfactant can enhance the colloidal stability of the composition or change the interaction of the ink with either the printing substrate, such as printing paper, or with the ink printhead. Various anionic, cationic and nonionic surfactants can be used in conjunction with the ink composition of the present invention, and these may be used neat or as a water solution. In one embodiment, the surfactant is present in an amount ranging from 0.05% to 5%, e.g., an amount ranging from 0.1% to 5%, or from 0.5% to 2%, by weight relative to the total weight of the inkjet ink composition.

Representative examples of anionic surfactants include, but are not limited to, higher fatty acid salts, higher alkyl-dicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Representative examples of cationic surfactants include aliphatic amines, quaternary ammonium salts, sulfonium salts, phosphonium salts and the like.

Representative examples of nonionic surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

In one embodiment, the inkjet ink further comprises at least one water-soluble compound having a hydroxyl number of at least 80, wherein the at least one water-soluble compound is selected from ethoxylated $C_3$-$C_{20}$ polyols, such as ethoxylated triols, ethoxylated tetraols, ethoxylated pentaols, and ethoxylated hexaols. In one embodiment, the ethoxylated $C_3$-$C_{20}$ polyols are selected from ethyoxylated glycerol, ethoxylated pentaerythritol, ethoxylated trimethylolpropane, ethoxylated glucoside, and ethoxylated glucose. In another embodiment, the at least one water-soluble compound is selected from polyols having three or more hydroxyl groups (e.g., xylitol and sorbitol), and polyether polyols. The at least one water-soluble compound can be present in an amount ranging from 1% to by 60% weight, relative to the total weight of the inkjet ink composition.

In one embodiment, the inkjet ink composition has a viscosity ranging from 1-25 cP. It is understood that viscosity can be adjusted by a variety of methods. Exemplary rheological additives to adjust the viscosity of an inkjet ink composition include, but are not limited to, alkali swellable emulsions (such as Rheovis® AS rheology-control additive from BASF), hydrophobically modified alkali swellable emulsions (such as Rheovis® HS rheology-control additive from BASF), hydrophobically modified polyurethanes (such as Rheovis® PU rheology-control additive from BASF), and hydrophobically modified polyethers (such as Rheovis® PE rheology-control additive from BASF).

In one embodiment, the inkjet ink compositions may further comprise dyes to modify color balance and adjust optical density. Exemplary dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts.

In one embodiment, the inkjet ink compositions can further comprise one or more suitable additives to impart a number of desired properties while maintaining the stability of the compositions. Other additives are well known in the art and include humectants, biocides and fungicides, pH control agents, drying accelerators, penetrants, and the like. The amount of a particular additive will vary depending on a variety of factors but are generally present in an amount ranging between 0.01% and 40% based on the weight of the inkjet ink composition. In one embodiment, the at least one additive is present in an amount ranging from 0.05% to 5%, e.g., an amount ranging from 0.1% to 5%, or an amount ranging from 0.5% to 2%, by weight relative to the total weight of the inkjet ink composition Humectants and water soluble organic compounds other than the at least one organic solvent may also be added to the inkjet ink composition of the present invention, e.g., for the purpose of preventing clogging of the nozzle as well as for providing paper penetration (penetrants), improved drying (drying accelerators), and anti-cockling properties. In one embodiment, the humectant and/or water soluble compound is present in an amount ranging from 0.1% to 50%, e.g., an amount ranging from 1% to 50%, from 0.1% to 30%, from 1% to 30%, from 0.1% to 10%, or from 1% to 10%.

Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, isopropyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and &-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the aqueous dispersions or inkjet ink composition disclosed herein. Biocides are important in preventing bacterial growth since bacteria are often larger than ink nozzles and can cause clogging as well as other printing problems. Examples of useful biocides include, but are not limited to, benzoate or sorbate salts, and isothiazolinones. In one embodiment, the biocides and/or fungicides are present in an amount ranging from 0.05% to 5% by weight, 0.05% to 2% by weight, 0.1% to 5% by weight, or 0.1% to 2% by weight, relative to the total weight of the composition.

EXAMPLES

A series of inks were prepared to demonstrate the improvement in O.D. of inks containing the acrylic polymers disclosed herein. Table 1 below lists the ink formulation used for the examples and comparative examples.

TABLE 1

| | |
|---|---|
| Pigment | 5% |
| Glycerol | 10% |
| 2-pyrrolidinone | 4% |
| 1,2-hexanediol | 6% |
| S465* | 1% |
| polymer additive | 1% |
| Water | balance |

*S465 = Surfynol® 465 surfactant, an ethoxylated acetylenic diol (Air Products)

The polymeric additives used for the examples and comparative examples are listed below:

Joncryl® resins—styrene acrylic polymers from BASF neutralized by sodium hydroxide or used as is if already predissolved in base; Joncryl® resins 50, 684, 680, 675, 693, 60, 7025, 96, 71, 586 are used (abbreviated as J50, J684, J680, J675, J693, J60, J7025, J96, J71, J586);

SMA® resins—styrene/maleic anhydride polymers from Cray Valley; SMA® resins 1440, 2000, 3000, EF40, and EF60 are used after hydrolysis with NaOH (abbreviated as SMA 1440, SMA 2000, SMA 3000, SMA EF40, and SMA EF60);

Pluronic® F38 surfactant—a triblock copolymer based on polyethylene oxide/polypropylene oxide (PEO/PPO) from BASF (abbreviated as Plur. F38);

PVP10K—a polyvinylpyrrolidone having an average molecular weight of 10,000, from Sigma Aldrich;

PEG 1000—a polyethylene glycol having an average molecular weight of 1000, from Sigma Aldrich; and AQ55S or AQ™ 55S polymer—a sulfonated polyester from Eastman Chemical.

A control ink was also prepared according to the formulation of Table 1 but without polymer additive.

In the examples and comparative examples, inks made with various polymer additives were evaluated on two plain papers without inkjet treatment: Xerox 4200 (Xerox) and Staples copy paper (Staples) and an inkjet treated paper from HP: HP multipurpose ultra white (HPMP).

Drawdowns of inks (70 µL) were obtained with a #3 wire-wound lab rod on each of the Staples, Xerox and HPMP papers. The optical density (OD) was obtained by using an X-rite 530 spectrophotometer with the following settings: Illumination at D65, 2 degree Standard Observer, DIN density standard, white base set to Abs, and no filter. For each paper, the OD value was reported as an average of at least 3 measurements taken at the top, medium and bottom of the drawdown images.

The control ink was evaluated on HPMP paper for OD variability. Table 2 lists the variability of OD measurements on drawdowns.

TABLE 2

| Control ink | HPMP |
|---|---|
| OD1 | 1.42 |
| OD2 | 1.45 |
| OD3 | 1.42 |
| OD4 | 1.46 |
| OD5 | 1.43 |
| standard deviation ($\sigma$) | 0.018 |
| 3$\sigma$ | 0.05 |

For the control ink, the standard deviation ($\sigma$) was 0.02. Accordingly, a threshold OD difference was determined to be an increase or decrease of greater than or equal to 3$\sigma$, i.e., greater than or equal to 0.05.

Examples 1-7 and Comparative Examples 1-13

From the formulation of Table 1, Examples 1-7 were prepared with various acrylic resins. Comparative Examples 1-13 were prepared with either non-acrylic resins or with acrylic resins having a molecular weight greater than 15,000 and/or an acid number less than 150. For each of Examples 1-7, Comparative Examples 1-13, and the control sample, the pigment used was carbon black modified with bisphosphonate groups, prepared as described in Example 72 of U.S. Pat. No. 8,858,695, the disclosure of which is incorporated herein by reference, which has a calcium index value of 3.45.

Table 3 provides the polymer additives and their properties for each of Examples 1-7 and Comparative Examples 1-13, as well as the corresponding OD data on non-inkjet treated (plain) papers (Xerox and Staples) and inkjet treated paper (HPMP). The Δ OD value=OD (sample)−OD(control).

TABLE 3

| Ink | Polymer | Polymer type | Mw | AN | OD HPMP | OD Xerox | OD Staples | Δ OD HPMP | Δ OD Xerox | Δ OD Staples | Rating |
|---|---|---|---|---|---|---|---|---|---|---|---|
| control | none | — | — | — | 1.43 | 1.04 | 1.12 | 0 | 0 | 0 | |
| Ex 1 | J50 | acrylic | 1700 | 238 | 1.4 | 1.12 | 1.19 | −0.03 | 0.08 | 0.07 | A |
| Ex 2 | J684 | acrylic | 1800 | 244 | 1.39 | 1.14 | 1.19 | −0.04 | 0.1 | 0.07 | A |
| Ex 3 | J680 | acrylic | 4900 | 215 | 1.39 | 1.11 | 1.19 | −0.04 | 0.07 | 0.07 | A |

TABLE 3-continued

| Ink | Polymer | Polymer type | Mw | AN | OD HPMP | OD Xerox | OD Staples | Δ OD HPMP | Δ OD Xerox | Δ OD Staples | Rating |
|---|---|---|---|---|---|---|---|---|---|---|---|
| Ex 4 | J675 | acrylic | 5700 | 222 | 1.39 | 1.1 | 1.19 | −0.04 | 0.06 | 0.07 | A |
| Ex 5 | J693 | acrylic | 6000 | 205 | 1.4 | 1.1 | 1.18 | −0.03 | 0.06 | 0.06 | A |
| Ex 6 | J60 | acrylic | 8600 | 215 | 1.4 | 1.13 | 1.22 | −0.03 | 0.09 | 0.1 | A |
| Ex 7 | J7025 | acrylic | 12500 | 235 | 1.41 | 1.15 | 1.21 | −0.02 | 0.11 | 0.09 | A |
| Ex 8 | J683 | acrylic | 8000 | 165 | 1.42 | 1.1 | 1.19 | −0.01 | 0.06 | 0.07 | A |
| Comp 1 | J96 | acrlics | 16000 | 220 | 1.31 | 1.13 | 1.18 | −0.12 | 0.09 | 0.06 | B |
| Comp 2 | J71 | acrylic | 17250 | 214 | 1.35 | 1.11 | 1.19 | −0.08 | 0.07 | 0.07 | B |
| Comp 3 | J586 | acrylic | 4600 | 108 | 1.43 | 1.08 | 1.16 | 0 | 0.04 | 0.04 | C |
| Comp 4 | J201 | acrylic | 16000 | 125 | 1.43 | 1.08 | 1.17 | 0 | 0.04 | 0.05 | C |
| Comp 5 | SMA1440 | SMA | 7000 | 185 | 1.35 | 1.09 | 1.18 | −0.08 | 0.05 | 0.06 | C |
| Comp 6 | SMA2000 | SMA | 7500 | 355 | 1.33 | 1.09 | 1.15 | −0.1 | 0.05 | 0.03 | C |
| Comp 7 | SMA3000 | SMA | 9500 | 280 | 1.31 | 1.1 | 1.17 | −0.12 | 0.06 | 0.05 | B |
| Comp 8 | SMA EF40 | SMA | 11000 | 215 | 1.36 | 1.07 | 1.14 | −0.07 | 0.03 | 0.02 | C |
| Comp 9 | SMA EF60 | SMA | 11500 | 156 | 1.35 | 1.07 | 1.16 | −0.08 | 0.03 | 0.04 | C |
| Comp 10 | Plur. F38 | PEO/PPO | 4700 | 0 | 1.45 | 1.07 | 1.15 | 0.02 | 0.03 | 0.03 | C |
| Comp 11 | PEG1000 | PEG | 1000 | 0 | 1.44 | 1.06 | 1.16 | 0.01 | 0.02 | 0.04 | C |
| Comp 12 | PVP10K | PVP | 10000 | 0 | 1.43 | 1.07 | 1.13 | 0 | 0.03 | 0.01 | C |
| Comp 13 | AQ55S | polyester | 20000 | 37 | 1.35 | 1.05 | 1.12 | −0.08 | 0.01 | 0 | C |

The "Rating" is determined according to the parameters of Table 4.

TABLE 4

| | |
|---|---|
| A | Δ OD ≥ 0.05 on both plain papers and Δ OD ≥ −0.05 on treated paper |
| B | Δ OD ≥ 0.05 on both plain papers and Δ OD < −0.05 on treated paper |
| C | Δ OD < 0.05 on at least one plain paper |

From the data of Table 3, it can be seen that acrylic polymers according to the claimed invention afforded better OD on the two plain papers and little change on the inkjet-treated paper. Inks comprising polymers having a low acid number do not display any O.D. improvement. Inks comprising polymers having a high molecular weight show decreased O.D. performance on the treated paper.

Comparative Examples 14-29

The inks of Comparative Examples 14-29 were prepared according to Table 1 where the carbon black is modified with groups having a calcium index of less than or equal to that of 1,2,3-benzene tricarboxylic acid. Specifically, the pigments are modified with the following functional groups: toluene sulfonic acid (Comparative Examples 14-17); benzoic acid (Comparative Examples 18-21); isophthalic acid (Comparative Examples 22-25); and 1,2,3-benzene tricarboxylic acid (Comparative Examples 26-29), each of which was prepared according to the method of U.S. Pat. No. 5,571,311, the disclosure of which is incorporated herein by reference. Table 5 lists the polymer additives and OD data.

TABLE 5

| | Polymer | OD HPMP | OD Xerox | OD Staples | Δ OD HPMP | Δ OD Xerox | Δ OD Staples | Rating |
|---|---|---|---|---|---|---|---|---|
| Comp 14 | — | 1.12 | 0.97 | 0.99 | 0 | 0 | 0 | |
| Comp 15 | J50 | 1.11 | 0.98 | 1.01 | 0 | 0.01 | 0.02 | C |
| Comp 16 | J586 | 1.16 | 0.99 | 1.01 | 0.04 | 0.02 | 0.02 | C |
| Comp 17 | SMA EF40 | 1.16 | 0.99 | 1.01 | 0.04 | 0.02 | 0.01 | C |
| Comp 18 | — | 1.22 | 1 | 1.01 | 0 | 0 | 0 | |
| Comp 19 | J50 | 1.2 | 1 | 1.01 | −0.01 | −0.01 | 0 | C |
| Comp 20 | J586 | 1.24 | 1.01 | 1.02 | 0.03 | 0 | 0.01 | C |
| Comp 21 | SMA EF40 | 1.22 | 1 | 1.01 | 0 | 0 | 0.01 | C |
| Comp 22 | — | 1.22 | 1 | 1 | 0 | 0 | 0 | |
| Comp 23 | Joncryl 50 | 1.2 | 1.03 | 1.04 | −0.02 | 0.03 | 0.04 | C |
| Comp 24 | Joncryl 586 | 1.22 | 1.02 | 1.03 | 0 | 0.01 | 0.03 | C |
| Comp 25 | SMA EF 40 | 1.21 | 1.02 | 1.03 | −0.01 | 0.02 | 0.03 | C |
| Comp 26 | — | 1.22 | 1 | 1.01 | 0 | 0 | 0 | |
| Comp 27 | Joncryl 50 | 1.2 | 1 | 1.01 | −0.01 | −0.01 | 0 | C |
| Comp 28 | Joncryl 586 | 1.24 | 1.01 | 1.02 | 0.03 | 0 | 0.01 | C |
| Comp 29 | SMA EF 40 | 1.22 | 1 | 1.01 | 0 | 0 | 0.01 | C |

Unlike the examples listed in Table 3, the data of Table 5 indicates that little or no OD effect is seen using these carbon black dispersions with various polymer additives, even polymer additives according to the claimed invention. It can be seen that the combination of the claimed polymer and pigment achieves the desired OD effect.

Example 9 and Comparative Examples 30-36

This set of samples demonstrate the OD response of pigment red 122 (PR122) treated with functional groups having different calcium binding indices in the presence of polymer additives. Specifically, the pigments are modified with the following functional groups: toluene sulfonic acid (Comparative Examples 30-33), prepared according to the method of U.S. Pat. No. 5,571,311, the disclosure of which is incorporated herein by reference; and bisphosphonic acid (Example 9 and Comparative Examples 34-36), prepared as described in Example 72 of U.S. Pat. No. 8,858,695, the disclosure of which is incorporated herein by reference. Table 6 lists the polymer additives and OD data.

TABLE 6

|  | Polymer | Mw | AN | OD HPMP | OD Xerox | OD Staples | Δ OD HPMP | Δ OD Xerox | Δ OD Staples | Rating |
|---|---|---|---|---|---|---|---|---|---|---|
| Comp 30 | — | — | — | 0.94 | 0.85 | 0.87 | 0 | 0 | 0 |  |
| Comp 31 | J60 | 8600 | 215 | 0.95 | 0.85 | 0.85 | 0.01 | 0 | −0.01 | C |
| Comp 32 | J586 | 4600 | 108 | 1.01 | 0.86 | 0.87 | 0.07 | 0 | 0 | C |
| Comp 33 | SMA EF40 | 11000 | 215 | 1.01 | 0.86 | 0.87 | 0.07 | 0 | 0 | C |
| Comp 34 | — | — | — | 1.15 | 0.84 | 0.86 | 0 | 0 | 0 |  |
| Ex 9 | J60 | 8600 | 215 | 1.14 | 0.89 | 0.93 | −0.01 | 0.05 | 0.07 | A |
| Comp 35 | J586 | 4600 | 108 | 1.1 | 0.85 | 0.89 | −0.05 | 0.01 | 0.03 | C |
| Comp 36 | SMA EF40 | 11000 | 215 | 1.07 | 0.85 | 0.89 | −0.08 | 0.02 | 0.03 | C |

From the data of Table 5 with PR122 as the base pigment, the OD response shows a similar trend to the carbon black examples. Only in Example 9, where PR122 was surface treated with a functional group having a higher calcium binding index, an OD increase on the two plain papers is observed in the presence of a low molecular weight and high acid number polymer.

Example 10

Inks containing were prepared containing Joncryl® 693 acrylic polymer neutralized with different bases to compare the O.D. properties and solvent compatibility properties. The ink formulation used is shown in Table 1 and the bases used were sodium hydroxide, potassium hydroxide, tetraethylammonium hydroxide, diethanolamine, triethanolamine, guanidine carbonate, and arginine. Optical density was determined via drawdowns of the inks on Xerox paper as described above. A solvent capability rating was obtained based on viscosity measurements after the inks were allowed to evaporate at room temperature in a fume hood until 40% weight loss occurred. An ink was determined to be "unacceptable" if the relative viscosity (evaporated ink versus original rink) was greater than 6. Table 7 below lists the data for the various inks below.

TABLE 7

| Counterion | OD | Solvent Compatibility Rating |
|---|---|---|
| Sodium | 1.13 | not acceptable |
| Potassium | 1.14 | not acceptable |

TABLE 7-continued

| Counterion | OD | Solvent Compatibility Rating |
|---|---|---|
| tetraethylammonium | 1.03 | acceptable |
| diethanolammonium | 1.04 | acceptable |
| triethanolammonium | 1.03 | acceptable |
| guanidine cation | 1.04 | not acceptable |
| arginine cation | 1.12 | acceptable |

From the data above it can be seen that arginine, which falls within the claimed invention, achieves high OD while maintaining an acceptable compatibility rating.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An inkjet ink composition comprising:
   at least one pigment having attached at least one organic group having a calcium index value greater than a calcium index value of 1,2,3-benzene tricarboxylic acid;
   at least one acrylic polymer having an acid number of at least 150 mg KOH/g and a weight average molecular weight ranging from 1,000 to 15,000, wherein the at least one acrylic polymer is at least partially neutralized with a base having the following structure:

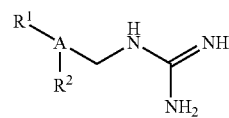

wherein:

A is a $C_2$-$C_{12}$ alkyl, $R^1$ is selected from H, $C_1$-$C_{12}$ alkyl, an amine having the formula —$NR^3R^4$, and a guanidine residue having the formula —$N(R^5)$—$C(=NH)$—$N(R^6)(R^7)$, wherein $R_3$ to $R^7$ are independently selected from H and $C_1$-$C_{12}$ alkyl, and $R^2$ is selected from H, $C_1$-$C_{12}$ alkyl, and an acid group; and an aqueous liquid medium.

2. The composition of claim 1, wherein the acid number ranges from 150 to 400 mg KOH/g.

3. The composition of claim 1, wherein the acid number is at least 160 mg KOH/g.

4. The composition of claim 1, wherein the molecular weight ranges from 1,000 to 13,000.

5. The composition of claim 1, wherein the at least one acrylic polymer is self-dispersible or soluble in the aqueous liquid medium.

6. The composition of claim 1, wherein the at least one acrylic polymer is a copolymer.

7. The composition of claim 1, wherein the at least one acrylic polymer comprises at least one acrylic monomer in an amount of at least 20 mol %.

8. The composition of claim 1, wherein the at least one acrylic polymer comprises at least one acrylic monomer in an amount ranging from 20 mol % to 75 mol %.

9. The composition of claim 7, wherein the at least one acrylic monomer is selected from acrylic acid, methacrylic acid, crotonic acid, ethacrylic acid, propylacrylic acid, isopropylacrylic acid, itaconic acid, fumaric acid, and salts thereof.

10. The composition of claim 7, wherein the at least one acrylic monomer is selected from acrylic acid and methacrylic acid.

11. The composition of claim 7, further comprising at least one second monomer selected from: esters, aminoesters and amides of acrylic acid, methacrylic acid, crotonic acid, ethacrylic acid, propylacrylic acid, isopropylacrylic acid, itaconic acid, fumaric acid, and maleic acid; addition reaction products between oil and fatty acids and (meth)acrylic ester monomers having an oxirane structure; addition reaction products between oxirane compounds containing an alkyl group having 3 or more carbon atoms and (meth)acrylic acid; styrenes; acrylonitriles; acetates; and allyl alcohols.

12. The composition of claim 1, wherein the at least one organic group comprises at least two phosphonic acid groups, esters thereof, or salts thereof.

13. The composition of claim 1, wherein the at least one organic group comprises at least one geminal bisphosphonic acid group, esters thereof, or salts thereof.

14. The composition of claim 1, wherein the at least one organic group comprises at least one group having the formula —$CQ(PO_3H_2)_2$ or salts thereof, wherein Q is H, R, OR, SR, or $NR_2$ wherein R, which can be the same or different, is selected from H, $C_1$-$C_{18}$ alkyl, $C_1$-$C_{18}$ acyl, aralkyl, alkaryl, and aryl.

15. The composition of claim 1, wherein the at least one organic group comprises at least one group having the formula —$(CH_2)_n$—$CQ(PO_3H_2)_2$ or salts thereof, wherein n is an integer ranging from 1 to 9.

16. The composition of claim 1, wherein the at least one organic group comprises at least one group having the formula —$CR=C(PO_3H_2)_2$ or salts thereof, and wherein R is selected from H, $C_1$-$C_6$ alkyl, and aryl.

17. The composition of claim 1, wherein the at least one organic group comprises at least one phosphonic acid group or a salt thereof, and at least one second ionic, ionizable, or basic group vicinal or geminal to the at least one phosphonic acid group or salt thereof.

18. The composition of claim 1, wherein the aqueous liquid medium is water.

19. The composition of claim 1, wherein the at least one acrylic polymer is at least 40% neutralized with the base.

20. The composition of claim 1, wherein A is a $C_2$-$C_6$ alkyl.

21. The composition of claim 1, wherein $R^1$ is an amine having the formula —$NR^3R^4$.

22. The composition of claim 21, wherein $R^1$ is an amine having the formula —$NR^3R^4$ and at least one of $R^3$ and $R^4$ is H.

23. The composition of claim 21, wherein $R^1$ is an amine having the formula —$NR^3R^4$ and $R^3$ and $R^4$ are H.

24. The composition of claim 21, wherein $R^1$ is a guanidine residue having the formula —$N(R^5)$—$C(=NH)$—$N(R^6)(R^7)$.

25. The composition of claim 1, wherein $R^2$ is an acid group selected from carboxylic acid, sulfonic acid, and phosphonic acid.

26. The composition of claim 1, wherein $R^2$ is an acid group selected from carboxylic acid.

27. The composition of claim 1, wherein the at least one acrylic polymer is at least partially neutralized with a base having a net charge of +1.

28. The composition of claim 1, wherein the composition has a pH ranging from 6 to 10.

* * * * *